(12) United States Patent
Hoshino et al.

(10) Patent No.: US 9,730,188 B2
(45) Date of Patent: Aug. 8, 2017

(54) TERMINAL DEVICE, BASE STATION DEVICE, RETRANSMISSION METHOD, AND RESOURCE ALLOCATION METHOD

(75) Inventors: Masayuki Hoshino, Kanagawa (JP); Akihiko Nishio, Kanagawa (JP); Daichi Imamura, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 220 days.

(21) Appl. No.: 13/816,587

(22) PCT Filed: Jul. 29, 2011

(86) PCT No.: PCT/JP2011/004322
§ 371 (c)(1),
(2), (4) Date: Feb. 12, 2013

(87) PCT Pub. No.: WO2012/020552
PCT Pub. Date: Feb. 16, 2012

(65) Prior Publication Data
US 2013/0142160 A1    Jun. 6, 2013

(30) Foreign Application Priority Data
Aug. 13, 2010   (JP) .................................. 2010-181344

(51) Int. Cl.
*H04W 4/00* (2009.01)
*H04W 72/04* (2009.01)
(Continued)

(52) U.S. Cl.
CPC .......... *H04W 72/04* (2013.01); *H04B 7/0456* (2013.01); *H04J 13/004* (2013.01);
(Continued)

(58) Field of Classification Search
CPC ... H04L 5/0053; H04L 5/0055; H04L 5/0048; H04L 27/2601; H04L 27/2647;
(Continued)

(56) References Cited

U.S. PATENT DOCUMENTS 8,699,426 B2    4/2014   Gaal et al.
8,891,476 B2    11/2014  Gaal et al.
(Continued)

FOREIGN PATENT DOCUMENTS

CN    101611586 A    12/2009
CN    101741462 A    6/2010
(Continued)

OTHER PUBLICATIONS

R1-104219, "Way Forward on CS and OCC signalling for UL DMRS", Panasonic, Samsung, Motorola, NTT Docomo, NEC, Panatech.
(Continued)

*Primary Examiner* — Andrew Chriss
*Assistant Examiner* — Atique Ahmed
(74) *Attorney, Agent, or Firm* — Pearne & Gordon, LLP

(57) ABSTRACT

The present invention provides a terminal device that allows constraints on user allocation to be prevented and spread codes to be allocated in a scheduler when non-adaptive HARQ is employed using a PHICH. A codeword generator (103) generates code words (CW) by encoding data, a layer mapping unit (108) places each CW in one or a plurality of layers, a DMRS generator (110) generates a reference signal for each layer in which a CW is placed by using any resource among a plurality of resources defined by a mutually orthogonal plurality of OCCs, and an ACK/NACK demodulator (102) receives a response signal indicating a retransmission request. When a response signal requesting retransmission of only a CW placed in a plurality of layers is
(Continued)

received, the DMRS generator (110) uses each resource having the same OCC among the plurality of resources for the reference signals generated in the corresponding layers.

12 Claims, 10 Drawing Sheets

(51) Int. Cl.
| | |
|---|---|
| H04L 25/03 | (2006.01) |
| H04B 7/0456 | (2017.01) |
| H04L 1/00 | (2006.01) |
| H04J 13/00 | (2011.01) |
| H04J 13/18 | (2011.01) |
| H04L 1/18 | (2006.01) |

(52) U.S. Cl.
CPC ............ *H04J 13/18* (2013.01); *H04L 1/0026* (2013.01); *H04L 1/1861* (2013.01); *H04L 25/03929* (2013.01); *H04L 25/03949* (2013.01); *H04L 1/1819* (2013.01)

(58) Field of Classification Search
CPC ........... H04W 72/042; H04W 74/0833; H04W 88/06; H04W 88/08; H04W 24/02; H04W 48/18; H04B 1/707; H04B 7/0413; H04B 7/0417
USPC ......................... 370/329, 342, 332; 375/260
See application file for complete search history.

(56) References Cited

U.S. PATENT DOCUMENTS

| | | | |
|---|---|---|---|
| 2004/0123229 A1* | 6/2004 | Kim | H03M 13/09 |
| | | | 714/800 |
| 2006/0056355 A1* | 3/2006 | Love et al. | 370/332 |
| 2008/0192718 A1* | 8/2008 | Jongren | H04B 7/0617 |
| | | | 370/342 |
| 2008/0225965 A1 | 9/2008 | Pi et al. | |
| 2008/0311942 A1* | 12/2008 | Kim | H04L 1/1854 |
| | | | 455/509 |
| 2009/0196229 A1* | 8/2009 | Shen | H04B 1/69 |
| | | | 370/328 |
| 2009/0279493 A1 | 11/2009 | Gaal et al. | |
| 2010/0173625 A1 | 7/2010 | Noh et al. | |
| 2010/0284483 A1* | 11/2010 | Jongren | 375/267 |
| 2011/0026622 A1* | 2/2011 | Luo | H04L 1/1614 |
| | | | 375/260 |
| 2012/0008556 A1* | 1/2012 | Noh | H04L 1/1893 |
| | | | 370/328 |
| 2013/0155982 A1 | 6/2013 | Gaal et al. | |

FOREIGN PATENT DOCUMENTS

| | | |
|---|---|---|
| JP | 2010-521078 A | 6/2010 |
| TW | 200847649 A1 | 12/2008 |
| TW | 200904089 A | 1/2009 |
| TW | 201012280 A | 3/2010 |
| WO | 2009120843 A2 | 10/2009 |

OTHER PUBLICATIONS

Samsung, HARQ handling in UL MIMO, 3GPP TSG RAN W1 Meeting #61bis, R1-102209, Apr. 12, 2010, Figure 4.
Sharp, Design of OCC / CS Mapping for UL DMRS, 3GPP TSG RAN WG1 Meeting #61bis, R1-103725 Jun. 28, 2010, Table 1.
Texas Instruments, UL DM RS Multiplexing for SU-MIMO, 3GPP TSG RAN WG1 Meeting #59, R1-094763, Nov. 9, 2009, Table 1-Table 3.
Ericsson, ST-Ericsson, Uplink MRS Resource Configuration for Rel-10, 3GPP TSG WG1 Meeting #61-bis, R1-104112, Jun. 28, 2010 Figure 4.
Panasonic, OCC and CS for UL DMRS in SU/MU-MIMO, 3GPP TAG RAN WG1 Meeting #62, R1-104906, Aug. 23, 2010, Figure 1.
LG Electronics, Remaining Issues on UL DM-RS for LTE-Advanced, 3GPP RAN WG1 Meeting #62, R1-104775, Aug. 23, 2010, Figure 1.
International Search Report for Application No. PCT/JP2011/004322 dated Sep. 20, 2011.
Office action for corresponding Russian Patent Application No. 2013105781/07 dated Feb. 3, 2015.
English translation of the Search Report for TW Application No. 100128705 dated Jul. 28, 2015.

* cited by examiner

TERMINAL DEVICE, BASE STATION DEVICE, RETRANSMISSION METHOD, AND RESOURCE ALLOCATION METHOD

TECHNICAL FIELD

The present invention relates to a terminal apparatus, a base station apparatus, a retransmission method and a resource allocating method.

BACKGROUND ART

In recent years, attempts have been made to improve throughput by providing a plurality of antennas on both a base station apparatus (referred to simply as a base station hereinafter) and a terminal apparatus (referred to simply as a terminal hereinafter) to introduce the MIMO (multiple-input multiple-output) communication technology on uplink. In this MIMO communication technology, a study is made on data transmission using precoding control in a terminal. In the precoding control, the base station estimates a channel condition between the base station and the terminal, from a receiving condition of a reference signal (Sounding Reference Signal: SRS) independently transmitted from each antenna of the terminal, selects a precoder which is optimal for the estimated channel condition and applies the precoder to data transmission.

Particularly, precoding control based on a transmission rank is applied to LTE-Advanced (Long Term Evolution-Advanced: hereinafter, referred to as a LTE-A). Specifically, the base station selects the most suitable rank and precoder for the channel matrix formed by the values of observed SRSs transmitted from the terminal. Herein, a rank refers to the number of space multiplexing (the number of layers) in space division multiplexing (SDM) and is the number of independent data transmitted at the same time. To be more specific, code books having different sizes are employed for respective ranks. The base station receives a reference signal transmitted from the terminal, estimates a channel matrix from the received signal, and selects a rank and a precoder which is optimal for the estimated channel matrix.

In a communication path such as mobile communication, having a relatively large channel variation, a hybrid automatic repeat request (HARQ) is applied for an error controlling technique. HARQ is a technique whereby the transmitting side retransmits data, and the receiving side combines the received data and the retransmitted data to improve error correction performance and achieve high quality transmission. As a HARQ method, adaptive HARQ and non-adaptive HARQ are under study. Adaptive HARQ is a method for allocating retransmitted data to any resource. On the other hand, non-adaptive HARQ is a method for allocating retransmitted data to predetermined resources. In an uplink of LTE, the non-adaptive HARQ scheme is employed among HARQ schemes.

A non-adaptive HARQ scheme will be described with reference to FIG. 1. In non-adaptive HARQ, the base station determines resources for allocating data in the first data allocation. The base station then reports transmission parameters to a terminal through a downlink control channel (PDCCH: Physical Downlink Control Channel). The transmission parameters include information such as allocated frequency resources indicating information on resource allocation, a transmission rank number, a precoder, and a modulation scheme/a coding rate. The terminal acquires the transmission parameters transmitted through the PDCCH and transmits first data, using a predetermined resource in accordance with the aforementioned resource allocation information.

The base station receives the first data and reports, to the terminal, a NACK corresponding to data which could not be demodulated in the first data, through a HARQ reporting channel (PHICH: Physical. Hybrid-ARQ Indicator Channel). The terminal receives the NACK and controls retransmission by using the transmission parameters reported through the PDCCH, the parameters including information resource allocation and the like. Specifically, the terminal generates and transmits retransmission data, using an allocation frequency resource, a precoder, a modulation scheme, and the like, which are the same as those in the first transmission. The terminal changes an RV (Redundancy Version) parameter depending on the number of retransmission requests. The RV parameter represents a reading position in a memory (referred to as a circular buffer) for storing Turbo-coded data. For example, when the memory is equally divided into approximately four regions and tops of the areas are assigned zero, one, two, and three respectively, the terminal changes an RV parameter (a reading position) in order of zero, two, one, three, and zero depending on the number of retransmission requests.

Non-adaptive HARQ is often used together with Synchronous HARQ employing the constant transmission interval. In LTE, retransmission data is retransmitted eight subframes after the report of the NACK.

Non-adaptive HARQ is performed on a per predetermined control unit basis, the control unit is referred to as a code word (CW). The CW is a control unit to which the same modulation scheme and coding rate are applied. As with the CW processed in a physical layer dealing with modulation and coding, the control unit may be referred to as a transport block (TB) since the control unit is processed in a MAC layer dealing with HARQ, and the CW may be distinguished from the TB. The present embodiment however employs uniform notation "CW" without a distinction therebetween hereafter.

In LTE, the transmission of one CW is generally applied to rank 1 (in transmission in a single rank) in the first transmission, and the transmission of two CWs is applied to ranks 2, 3, and 4 (in transmission in multiple ranks) in the first transmission. In the transmission in multiple ranks, CW0 is allocated to Layer 0 and CW1 is allocated to Layer 1 in rank 2. In rank 3, CW0 is allocated to Layer 0, and CW1 is allocated to Layer 1 and Layer 2. In rank 4, CW0 is allocated to Layer 0 and Layer 1, and CW1 is allocated to Layer 2 and Layer 3.

When retransmitting only CWs allocated to a plurality of layers, the terminal transmits one CW at a time in rank 2. To be more specific, when retransmitting CW1 in rank 3 and CW0 or CW1 in rank 4, the terminal transmits these CWs as one CW in rank 2.

Since the base station includes a larger number of antennas compared to the terminal, the base station is flexibly installed relatively. For this reason, a so-called multiuser MIMO, which assigns the same resource to a plurality of terminals, can be applied through an adequate process on a received signal in the base station. An example case will be described where the same resource is allocated to two terminals through the terminal having one transmitting antenna and the base station having two receiving antennas. This case can be equivalently treated as a MIMO channel with two transmitting antennas and two receiving antennas, and the base station can process a received signal. To be more specific, the base station performs a general MIMO received-signal process such as spatial filtering, canceller, and maximum likelihood estimation, thereby detecting respective signals transmitted from a plurality of terminals. With multiuser MIMO, the base station estimates interference values between terminals based on the channel condition between the base station and each terminal, and sets transmission parameters for the respective terminals by considering interference values, in order to more stably operate a communication system.

As described above, a MIMO operation for a single terminal (a single user) provided with a plurality of antennas is sometimes referred to as a single-user MIMO to distinguish it from the multiuser MIMO. An operation to allocate a plurality of terminals, each of which is capable of a single-user MIMO operation and has more than one transmission antennas provided thereon, to the same resource is also referred to as a multiuser MIMO.

The terminal transmits not only the SRS described above but also a demodulation reference signal (Demodulation RS or DMRS) to the base station, and the base station uses the received DMRS for demodulating data. In LTE-A, the DMRS is transmitted for each layer. The terminal transmits the DMRS using the same precoding vector as that of the signal transmitted for each layer. In order for a plurality of terminals to transmit the DMRSs for a plurality of layers in the same frequency resource, some multiplexing process is needed. In LTE-A, as a process of multiplexing the DMRSs, multiplexing using an orthogonal cover code (OCC) is used in addition to multiplexing using a cyclic shift sequence used in LTE to multiplex a plurality of terminals.

The cyclic shift sequence is generated by cyclic shift of a predetermined one of CAZAC (constant amplitude zero auto-correlation) sequences having good auto-correlation characteristics and a constant amplitude. For example, twelve cyclic shift sequences each of which having a starting point at one of twelve points that equally divide a CAZAC sequence along the code length are used. In the following, the starting point will be expressed as $n_{CS}$.

As for the OCC, spreading codes having a sequence length of 2 are formed using a DMRS, which includes two symbols per sub-frame, taking into consideration the transmission format of the uplink data. To be more specific, in LTE-A, as OCCs, two spreading codes having a sequence length of 2, $\{+1, +1\}$ and $\{+1, -1\}$, are formed. In the following, a spreading code according to the OCC will be expressed as $n_{OCC}$. For example, the two spreading codes $\{+1, +1\}$ and $\{+1, -1\}$ are expressed as $n_{OCC}=0$ and 1, respectively.

Further, $n_{CS}$ and $n_{OCC}$ are included in transmission parameters reported from the base station to the terminal through the PDCCH. A specific method of reporting the transmission parameters including $n_{CS}$ and $n_{OCC}$, in particular, a specific reporting method using the single-user MIMO, will be described later.

Next, interference between DMRSs multiplexed in the same frequency resource will be described. FIG. 2 is a schematic diagram showing interference between DMRSs to which $n_{CS}=6$ and $n_{OCC}=0$ are allocated. The interference between the DMRSs formed by the cyclic shift sequence and the OCC described above is characterized in that the DMRSs having the same value of $n_{OCC}$ and adjacent values of $n_{CS}$ interfere with each other. For example, reference signals having the same value of $n_{OCC}$ and adjacent values of $n_{CS}$ that differ from each other by up to 3 or so (indicated by the arrows in FIG. 2) (that is, reference signals whose $n_{OCC}$ is 0 and whose $n_{CS}$ falls within a range of 3 to 5 or a range of 7 to 9 in FIG. 2) interfere with each other.

Therefore, as for $n_{CS}$, in order for reference signals to be allocatable at the same time, the values of $n_{CS}$ of the reference signals preferably differ by 6 or so.

As for $n_{OCC}$, on the other hand, if reference signals to be allocated (to be multiplexed) at the same time have the same code length, that is, the same bandwidth allocated thereto, the reference signals are expected to be orthogonal to each other if they have different values of $n_{OCC}$. The degree of the orthogonality (referred to simply as orthogonality) depends on the fading correlation between the two symbols in one sub-frame to which the reference signals (DMRSs) are allocated. For example, in a low-speed moving environment, which is a primary application of MIMO, high orthogonality is expected to be assured.

Next, a method of reporting a spreading code of a DMRS in the single-user MIMO will be described. According to a method of reporting a spreading code of a DMRS in LTE, the base station sets arbitrary spreading codes using a parameter $n_{DMRS}^{(1)}$ set for each user in a higher layer assuming a relatively long period and a parameter $n_{DMRS}^{(2)}$ that is a transmission parameter reported through the PDCCH and set for a relevant transmission sub-frame by decision of the scheduler, and indicates the spreading codes to the terminal. The terminal generates a DMRS using a prescribed $n_{CS}$ calculated from the indicated parameter ($n_{DMRS}^{(1)}$ or $n_{DMRS}^{(2)}$).

In LTE-A, there is proposed a method of expanding the reporting method described above to the single-user MIMO (see Non-Patent Literature 1, for example). In Non-Patent Literature 1, the starting point of the cyclic shift sequence and the set value of OCC for the k-th layer (k=0 to 3) are set as $n_{DMRS,k}^{(2)}$ (corresponding to $n_{CS}$ described above) and $n_{OCC,k}$, respectively. In Non-Patent Literature 1, information reported through higher layers or the PDCCH is only the set values ($n_{DMRS,0}^{(2)}$ and $n_{OCC,0}$) for the 0-th layer (k=0, Layer 0), and the set values for the remaining layers (k=1 to 3, Layers 1 to 3) are determined by calculation from the set values for the 0-th layer (k=0, Layer 0). This is an attempt to minimize the overhead involved in reporting of the controlling signal.

To be more specific, Non-Patent Literature 1 discloses that each set value is set as follows in order to avoid the interference between the reference signals as far as possible in the single-user MIMO.

Specifically, $n_{DMRS,0}^{(2)}$ is defined as $(n_{DMRS,0}^{(2)}+\Delta_k)$ mod 12
where
in transmission using two layers, $\Delta_k=0$ for k=0, and $\Delta_k=6$ for k=1,
in transmission using three layers, $\Delta_k=0$ for k=0, $\Delta_k=6$ for k=1, and $\Delta_k=3$ for k=2, or
$\Delta_k=0$ for k=0, $\Delta_k=4$ for k=1, and $\Delta_k=8$ for k=2, and
in transmission using four layers, $\Delta_k=0$ for k=0, $\Delta_k=6$ for k=1, $\Delta_k=3$ for k=2, and $\Delta_k=9$ for k=3.

Further, $n_{OCC,k}$ is defined as $n_{OCC,0}$ or $(1-n_{OCC,0})$
where
$n_{OCC,k}=n_{OCC,0}$ for k=1, and $n_{OCC,k}=(1-n_{OCC,0})$ for k=2 or 3.

CITATION LIST

Non-Patent Literature

NPL 1
R1-104219, "Way Forward on CS and OCC signalling for UL DMRS", Panasonic, Samsung, Motorola, NTT DOCOMO, NEC, Panatech

SUMMARY OF INVENTION

Technical Problem

A case where a terminal transmits data using the above-described conventional method for allocating spreading codes of a reference signal (DMRS), and a base station applies non-adaptive HARQ control using a PHICH will be described. In this case, the PHICH used for instructing data retransmission cannot carry information on transmission parameters. As a result, the same spreading codes for the reference signal as those used in the first transmission are used in retransmission of data, more specifically, retransmission of a CW in response to a NACK returned from the base station.

For example, in the case where the first transmission is transmission using three layers (rank 3 transmission) as shown in FIG. 3, the spreading codes (CS (starting point $n_{CS,k}$) and OCC (code $n_{OCC,k}$)) used for each layer (k=0 to 3) are the following three sets: $n_{CS,0}$=0 and $n_{OCC,0}$=0, $n_{CS,1}$=6 and $n_{OCC,1}$=0; and $n_{CS,2}$=3 and $n_{OCC,2}$=1. As shown in FIG. 3, it is assumed that the base station reports an instruction for retransmission of only CW1 in the PHICH to the terminal (CW0: ACK, CW1: NACK). Then, the spreading codes used in retransmission of CW1 are the same two sets as those used in the first transmission: $n_{CS,1}$=6 and $n_{OCC,1}$=0, and $n_{CS,2}$=3 and $n_{OCC,2}$=1. The two sets of spreading codes occupy both OCCs ($n_{OCC,k}$=0 and 1).

As a result, only the resources of spreading codes (referred to as a spreading code resource, hereinafter) in the region enclosed by the dashed line in the right half (in retransmission) of FIG. 3 are available for allocation to a new user to be multiplexed in the same resource. To be more specific, as shown in the right half of FIG. 3, for both OCCs ($n_{OCC,k}$=0 and 1), spreading code resources having $n_{CS}$s whose values differ by 6 or so are not available for allocation to a new user.

Thus, as shown in FIG. 3, when the scheduler at the base station is to multiplex a new user that performs transmission using two layers as a multiuser MIMO operation (when spreading codes having the same value of OCC and values of $n_{CS}$ that differ by 6 or so are to be used), there are no available spreading code resources, and no spreading code resources can be allocated to the new user.

As described above, when non-adaptive HARQ control is applied using the PHICH, there are restrictions on allocation of spreading codes to a new user by the scheduler.

An object of the present invention is to provide a terminal apparatus, a base station apparatus, a retransmitting method and a resource allocating method that allow a scheduler to perform a spreading code allocating operation by avoiding restrictions on allocation of a spreading code to a new user even in the case where non-adaptive HARQ control is applied using a PHICH.

Solution to Problem

A terminal apparatus reflecting an aspect of the present invention has: a code word generating section that generates a code word by encoding a data sequence; a mapping section that allocates each code word to one or a plurality of layers; a reference signal generating section that generates a reference signal for each of the layers to which the code word is allocated, using any of resources from among a plurality of resources defined by a plurality of codes orthogonal to each other; and a receiving section that receives a response signal indicating a retransmission request for the code word, and in a case where the received response signal is to request for retransmission of only a single code word allocated to the plurality of layers, the reference signal generating section uses resources having a same code from among the plurality of resources, for the reference signal generated for each of the plurality of layers.

A base station reflecting an aspect of the present invention has: a receiving section that receives a code word allocated to one or a plurality of layers; a detecting section that detects an error of the received code word; a response signal generating section that generates a response signal indicating a result of error detection of the code word; and a scheduling section that allocates any of resources from among a plurality of resources defined by a plurality of codes orthogonal to each other, to the reference signal to be transmitted from each terminal apparatus and to be generated for each of the layers to which the code word is allocated, and in a case where only the result of error detection of a single code word allocated to the plurality of layers shows a NACK, the scheduling section identifies resources used for the reference signal for each of the plurality of layers transmitted from a terminal apparatus to retransmit the single code word, as resources having a same code from among the plurality of resources, and allocates a resource having a different code than the same code from among the plurality of resources, to the reference signal transmitted from another terminal apparatus different from the terminal apparatus to perform the retransmission.

A retransmitting method reflecting an aspect of the present invention includes: generating a code word by encoding a data sequence; allocating each code word to one or a plurality of layers; generating a reference signal for each of the layers to which the code word is allocated, using any of resources from among a plurality of resources defined by a plurality of codes orthogonal to each other; and receiving a response signal indicating a retransmission request for the code word, and in a case where the received response signal is to request for retransmission of only a single code word allocated to the plurality of layers, resources having a same code from among the plurality of resources are used for the reference signal generated for each of the plurality of layers.

A resource allocating method reflecting an aspect of the present invention includes: receiving a code word allocated to one or a plurality of layers; detecting an error of the received code word; generating a response signal indicating a result of error detection of the code word; and allocating any of resources from among a plurality of resources defined by a plurality of codes orthogonal to each other, to the reference signal to be transmitted from each terminal apparatus and to be generated for each of the layers to which the code word is allocated, and in a case where only the result of error detection of a single code word allocated to the plurality of layers shows a NACK, resources used for the reference signal for each of the plurality of layers transmitted from a terminal apparatus to retransmit the single code word are identified as resources having a same code from among the plurality of resources, and a resource having a different code than the same code from among the plurality of resources is allocated to the reference signal transmitted from another terminal apparatus different from the terminal apparatus to perform the retransmission.

Advantageous Effects of Invention

According to the present invention, even in the case where non-adaptive HARQ control is applied using a PHICH, it is possible for a scheduler to perform a spreading code allocating operation by avoiding restrictions on allocation of a spreading code to a new user.

DESCRIPTION OF EMBODIMENTS

Embodiments of the present invention will now be described in detail with reference to the drawings.

Embodiment 1

Figure 4:
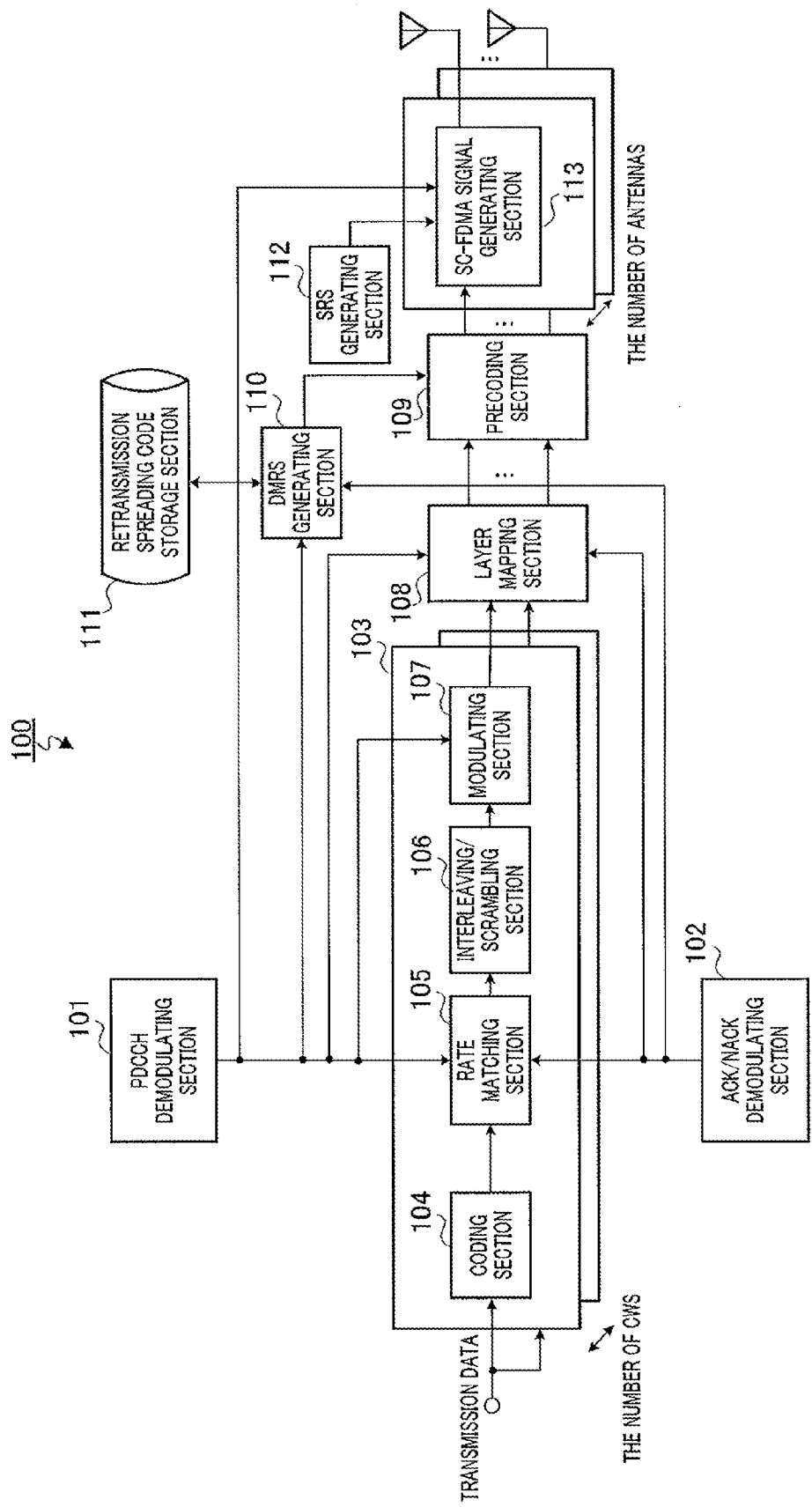
FIG. 4 is a block diagram showing a configuration of main components of a transmitting apparatus according to Embodiment 1 of the present invention.

FIG. 4 is a block diagram showing a configuration of main components of a transmitting apparatus according to the present embodiment. Transmitting apparatus 100 in FIG. 4 is applied to, for example, an LTE-A terminal. In order to avoid complicated explanation, FIG. 4 shows components associated with transmission of uplink data which is closely related to the present invention and components associated with reception of downlink response signals to that uplink data, and the illustration and explanation of components associated with reception of downlink data will be omitted.

PDCCH demodulating section 101 demodulates transmission parameters (parameters associated with data transmission) determined in a base station, from a PDCCH included in a signal transmitted from the base station (a receiving apparatus described later). The transmission parameters include information such as allocated frequency resources (allocated resource blocks (RBs), for example), a transmission rank number, a precoder, a modulation scheme, a coding rate, RV parameters used in retransmission, or spreading codes for the reference signal (DMRS) associated with a 0-th layer (k=0, Layer 0) ($n_{CS,0}$ (or $n_{DMRS,0}^{(2)}$) and $n_{OCC,0}$ described above, for example). PDCCH demodulating section 101 outputs the demodulated transmission parameters to rate matching section 105, modulating section 107, layer mapping section 108, DMRS generating section 110 and SC-FDMA signal generating section 113.

ACK/NACK demodulating section 102 demodulates, for each CW, ACK/NACK information indicating the result of error detection of the received signal at the base station, from a PHICH included in the signal transmitted from the base station (the receiving apparatus described later). Then, ACK/NACK demodulating section 102 outputs the demodulated ACK/NACK information to rate matching section 105, layer mapping section 108 and DMRS generating section 110.

The number of code word generating sections 103 depends on the number of code words (CW), and code word generating section 103 generates a CW by encoding input transmission data (a data sequence). Each code word generating section 103 includes coding section 104, rate matching section 105, interleaving/scrambling section 106 and modulating section 107.

Coding section 104 receives transmission data, provides CRC (Cyclic Redundancy Checking) to the transmission data, encodes the data to generate coded data, and outputs the generated coded data to rate matching section 105.

Rate matching section 105 includes a buffer and stores the coded data in the buffer. Rate matching section 105 then performs a rate matching process on the coded data based on the transmission parameters outputted from PDCCH demodulating section 101 to adaptively adjust an M-ary modulation value or a coding rate. Rate matching section 105 then outputs the coded data subjected to the rate matching process to interleaving/scrambling section 106. In retransmission (if the ACK/NACK information from ACK/NACK demodulating section 102 shows a NACK), rate matching section 105 reads a predetermined amount of coded data depending on the M-ary modulation value and the coding rate as retransmission data, from the starting position in the buffer indicated by the RV parameter outputted from PDCCH demodulating section 101. Rate matching section 105 then outputs the read retransmission data to interleaving/scrambling section 106.

Interleaving/scrambling section 106 performs an interleaving/scrambling process on the coded data received from rate matching section 105 and outputs the coded data subjected to the interleaving/scrambling process to modulating section 107.

Modulating section 107 performs an M-ary modulation on the coded data based on the transmission parameters received from PDCCH demodulating section 101 to generate modulated signals and outputs the modulated signals to layer mapping section 108.

Layer mapping section 108 maps, to each layer on a CW basis, the modulated signals received from modulating section 107 in each code word generating section 103 based on the transmission parameters received from PDCCH demodulating section 101 and the ACK/NACK information received from ACK/NACK demodulating section 102. Herein, layer mapping section 108 maps (allocates) each CW to one or more layers depending on the transmission rank number included in the transmission parameters, as described above. Layer mapping section 108 then outputs the mapped CWs to precoding section 109.

Precoding section 109 performs precoding process on the DMRS received from DMRS generating section 110 or the CWs received from layer mapping section 108 to apply a weight to each DMRS or CW. Precoding section 109 then outputs precoded CWs and DMRS to SC-FDMA (Single Carrier Frequency Division Multiple Access) signal generating section 113.

DMRS generating section 110 generates a DMRS for each of the layers, which depends on the transmission rank number, based on the transmission parameters received from PDCCH demodulating section 101 and the ACK/NACK information received from ACK/NACK demodulating section 102. In the present embodiment, a plurality of spreading code resources for DMRSs are defined based on cyclic shift sequences that can be separated from each other using different amounts of cyclic shift ($n_{CS,k}$=0 to 11, for example) and OCCs that are orthogonal to each other ($n_{OCC,k}$=0, 1, for example). DMRS generating section 110 generates a DMRS for each layer to which a CW is allocated, using any of the plurality of spreading code resources for DMRSs.

To be more specific, DMRS generating section 110 calculates, based on the spreading codes ($n_{CS,0}$ and $n_{OCC,0}$, for example) used in the DMRS associated with the 0-th layer (k=0, Layer 0), included in the transmission parameters, as described above, the spreading codes used in the DMRS associated with each of the other layers (k=1, 2 and 3, Layers 1, 2 and 3). DMRS generating section 110 outputs the spreading codes generated based on the transmission parameters received from PDCCH demodulating section 101 (that is, the spreading codes used in the DMRS indicated by the base station through the PDCCH) to retransmission spreading code storage section 111. If the ACK/NACK information received from ACK/NACK demodulating section 102 shows a NACK (that is, if retransmission is required), DMRS generating section 110 sets spreading codes used in the DMRS in CW retransmission based on the CW associated with the NACK and the spreading codes stored in retransmission spreading code storage section 111. A DMRS generating process conducted by DMRS generating section 110 in retransmission will be described later.

Retransmission spreading code storage section 111 stores the spreading codes received from DMRS generating section 110 (that is, the spreading code resource used for the DMRS generated for each layer in the first transmission and indicated through the PDCCH). Retransmission spreading code storage section 111 outputs the spreading codes stored therein to DMRS generating section 110 in response to a request from DMRS generating section 110.

SRS (Sounding Reference Signal) generating section 112 generates reference signal for measuring channel quality (SRS) and outputs the generated SRS to SC-FDMA signal generating section 113.

SC-FDMA signal generating section 113 performs SC-FDMA modulation on the reference signal (SRS) received from SRS generating section 112 or the precoded CW and DMRS to generate an SC-FDMA signal. SC-FDMA signal generating section 113 then performs a radio transmitting process (S/P (Serial/Parallel) transform, inverse Fourier transform, upconvert, amplification, and the like) on the generated SC-FDMA signal and transmits the signal subjected to the radio transmitting process through transmitting antennas. In view of the above, the first transmission data or retransmission data is transmitted to the receiving apparatus.

Figure 5:
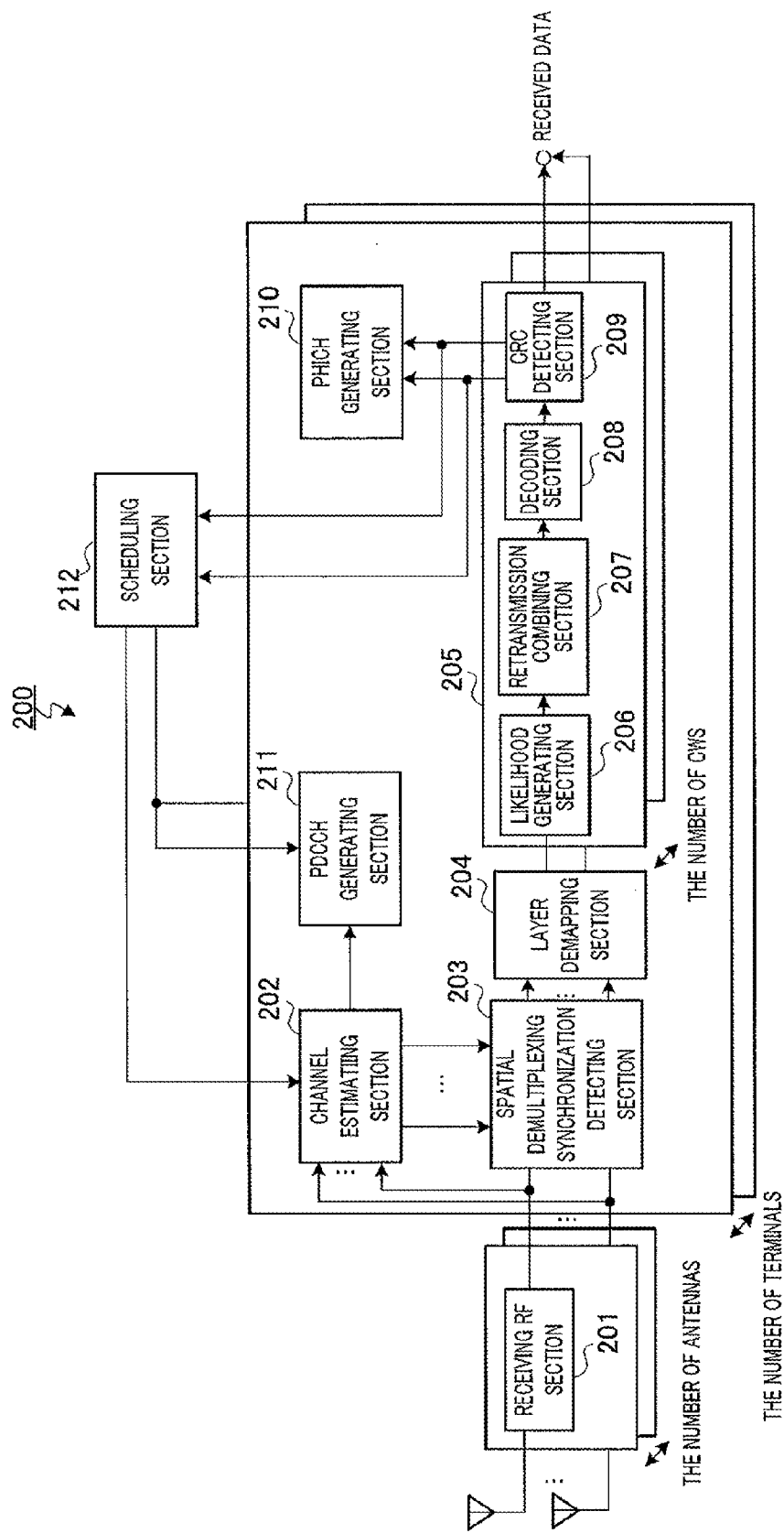
FIG. 5 is a block diagram showing a configuration of main components of a receiving apparatus according to Embodiment 1 of the present invention.

FIG. 5 is a block diagram showing a configuration of main components of a receiving apparatus according to the present embodiment. Receiving apparatus 200 in FIG. 5 is applied to, for example, an LTE-A base station. Note that, to avoid complication of explanation, FIG. 5 shows components associated with reception of uplink data which is closely related to the present invention and components associated with transmission of downlink response signals to that uplink data, and illustration and explanation of components associated with transmission of downlink data will be omitted.

The number of receiving RF section 201 depends on the number of antennas. Each receiving RF section 201 receives a signal transmitted from a terminal (transmitting apparatus 100 shown in FIG. 4) through antennas, transforms the received signal into a baseband signal through a radio receiving process (downconvert, Fourier transform, P/S transform and the like), and outputs the transformed baseband signal to channel estimating section 202 and spatial demultiplexing synchronization detecting section 203.

The number of sections for each of the sections from channel estimating sections 202 to PDCCH generating sections 211 depends on the number of terminals which the base station (receiving apparatus 200) can communicate with at the same time.

Channel estimating section 202 performs channel estimation based on a reference signal (DMRS) included in the baseband signal and calculates a channel estimation value. In this process, channel estimating section 202 identifies the spreading codes used in the DMRS in accordance with an instruction from scheduling section 212. Channel estimating section 202 then outputs the calculated channel estimation value to PDCCH generating section 211 and spatial demultiplexing synchronization detecting section 203.

Spatial demultiplexing synchronization detecting section 203 demultiplexes the baseband signals mapped to a plurality of layers, using the channel estimation value and outputs the demultiplexed baseband signals to layer demapping section 204.

Layer demapping section 204 combines the demultiplexed baseband signals for each CW and outputs the combined CW to likelihood generating section 206.

The number of error detecting sections 205 depends on the number of CWs. Each of error detecting section 205 includes likelihood generating section 206, retransmission combining section 207, decoding section 208, and CRC detecting section 209.

Likelihood generating section 206 calculates likelihood for each CW and outputs the calculated likelihood to retransmission combining section 207.

Retransmission combining section 207 stores past likelihoods for each CW and performs a retransmission-combining process on the retransmission data, based on the RV parameter and outputs the combining-processed likelihood to decoding section 208.

Decoding section 208 decodes a likelihood obtained through the retransmission-combining process to generate decoded data and outputs the generated decoded data to CRC detecting section 209.

CRC detecting section 209 performs an error detecting process by CRC on the decoded data outputted from decoding section 208 and outputs the result of error detection for each CW to PHICH generating section 210 and scheduling section 212. CRC detecting section 209 outputs the decoded data as received data.

PHICH generating section 210 allocates ACK/NACK information indicating the result of error detection received from CRC detecting section 209 associated with each CW to a PHICH for each CW. The PHICH is provided with an ACK/NACK resource as a response resource for each CW. For example, PHICH generating section 210 allocates an ACK to the ACK/NACK resource for the CW0 when the result of error detection for the CW0 indicates the absence of an error, and allocates a NACK to the ACK/NACK resource for the CW0 when the result of error detection for the CW0 indicates the presence of an error. Similarly, PHICH generating section 210 allocates an ACK to an ACK/NACK resource corresponding to CW1 when the result of error detection with respect to CW1 indicates the absence of an error, and allocates a NACK to the ACK/NACK resource corresponding to CW1 when the result of error detection with respect to CW1 indicates the presence of an error. In view of the above, PHICH generating section 210, as a response signal generating section, allocates an ACK or a NACK to a response resource provided in the PHICH for each CW. In this way, the ACK/NACK information indicating the result of error detection for each CW is allocated to the PHICH and transmitted to the terminal (transmitting apparatus 100) (not shown).

PDCCH generating section 211 estimates the channel condition based on the channel estimation value calculated by channel estimating section 202. Then, PDCCH generating section 211 determines transmission parameters for a plurality of terminals based on the estimated channel condition. In this process, PDCCH generating section 211 sets a spreading code resource used for the DMRS allocated to each terminal in accordance with an instruction from scheduling section 212. PDCCH generating section 211 allocates the set transmission parameters to the PDCCH. In this way, the transmission parameters for each terminal are allocated to the PDCCH and transmitted to each terminal (not shown).

Scheduling section 212 allocates any of a plurality of spreading code resources to the DMRS transmitted from each terminal and generated for each layer to which the CW transmitted by the terminal is allocated, based on the result of error detection inputted from CRC detecting section 209 associated with each CW. Then, scheduling section 212 indicates the spreading code resource allocated to each terminal to PDCCH generating section 211 associated with that terminal. Furthermore, scheduling section 212 indicates the spreading code resource allocated to each terminal to channel estimating section 202 associated with that terminal.

The operations of transmitting apparatus 100 (hereinafter, referred to as "a terminal") and receiving apparatus 200 (hereinafter, referred to as "a base station") configured as described above will now be described.

The terminal transmits a reference signal (SRS: Sounding Reference Signal) for estimating a channel condition (for measuring channel quality) in accordance with an instruction from the base station.

The base station receives the reference signal (SRS) and, based on the result of observation of the received signal, determines transmission parameters including allocated frequency resources (allocated RBs), a transmission rank number, a precoder, a modulation scheme, a coding rate, RV parameters used in retransmission, or spreading codes used in the reference signal (DMRS) associated with the 0-th layer (k=0, Layer 0). The base station reports the determined transmission parameters to the terminal through PDCCH. The terminal needs time corresponding to about four subframes to generate transmission data in LTE, for example. Thus, the base station needs to report resource allocation in the (n−4)-th subframe in order to generate transmission data transmitted in the n-th subframe. Therefore, the base station determines and reports transmission parameters based on a channel condition in the (n−4)-th subframe.

Then, the terminal extracts the transmission parameters from the PDCCH, generates the DMRS and a data signal for each layer based on the extracted transmission parameters, and performs a precoding on the DMRS and the data signal, thereby forming a transmission signal to be transmitted from each transmission antenna. The terminal transmits the generated transmission signal to the base station.

The spreading codes used in the DMRS associated with each layer (k=1, 2 or 3, Layer 1, 2 or 3) is determined based on the value for that layer relative to the value for the 0-th layer (k 0, Layer 0) which is included in the transmission parameters, as described above. In other words, the spreading codes for each of Layers 1, 2 and 3 is determined based on the spreading codes for Layer 0 (the spreading code included in the transmission parameters). The terminal also retains the spreading codes of the DMRS indicated through the PDCCH.

The base station performs a receiving process on the transmission signal transmitted from the terminal in the n-th subframe and generates the PHICH based on the result of error detection for each CW. In LTE, the base station can issue a retransmission instruction through the PDCCH as well as through the PHICH. However, such a situation is not closely related to the present invention and thus will not be described in detail.

The terminal refers to the PDCCH and the PHICH at a timing when the result of error detection is reported from the base station (in this case, the (n+4)-th subframe in LTE). The PHICH includes an instruction for HARQ.

When detecting an ACK from the PHICH, the terminal determines that the base station could successfully demodulate the corresponding CW and stops retransmission of the CW. On the other hand, when not detecting an ACK in the PHICH, the terminal determines that the base station could not demodulate the corresponding CW and instructs the CW to be retransmitted, and retransmits the CW at predetermined timing.

According to the aforementioned example, when not detecting an ACK corresponding to a CW transmitted in the n-th subframe, the terminal transmits retransmission data of the CW in the n+8-th subframe. For this transmission, as described above, the terminal uses the same transmission parameters (precoder, for example) as those indicated through the PDCCH in the (n−4)-th subframe, except that a predetermined value depending on the number of retransmission requests is used as the RV parameter, and values (spreading code resources) set in accordance with values (spreading code resources) stored in retransmission spreading code storage section 111 and the occurrences of ACKs and NACKs are used for the spreading codes of the DMRSs. A method of setting the spreading codes used in the DMRS in retransmission will be described hereinafter.

When the result of error detection of a CW indicates the absence of an error, the base station reports an ACK to the terminal, through a PHICH and instructs the transmission of the corresponding CW to be stopped. When the result of error detection of a CW indicates the presence of an error, the base station reports a NACK to the terminal through the PHICH. The base station performs a retransmission combining process and repeats a demodulating process. The base station performs demodulation of the retransmission data and resource allocation to another terminal based on the spreading code resources set in accordance with the spreading code resources indicated to the terminal in the first transmission and the result of error detection of the CW.

Next, a method of setting the spreading codes used in the DMRS in retransmission will be described.

Figure 6:
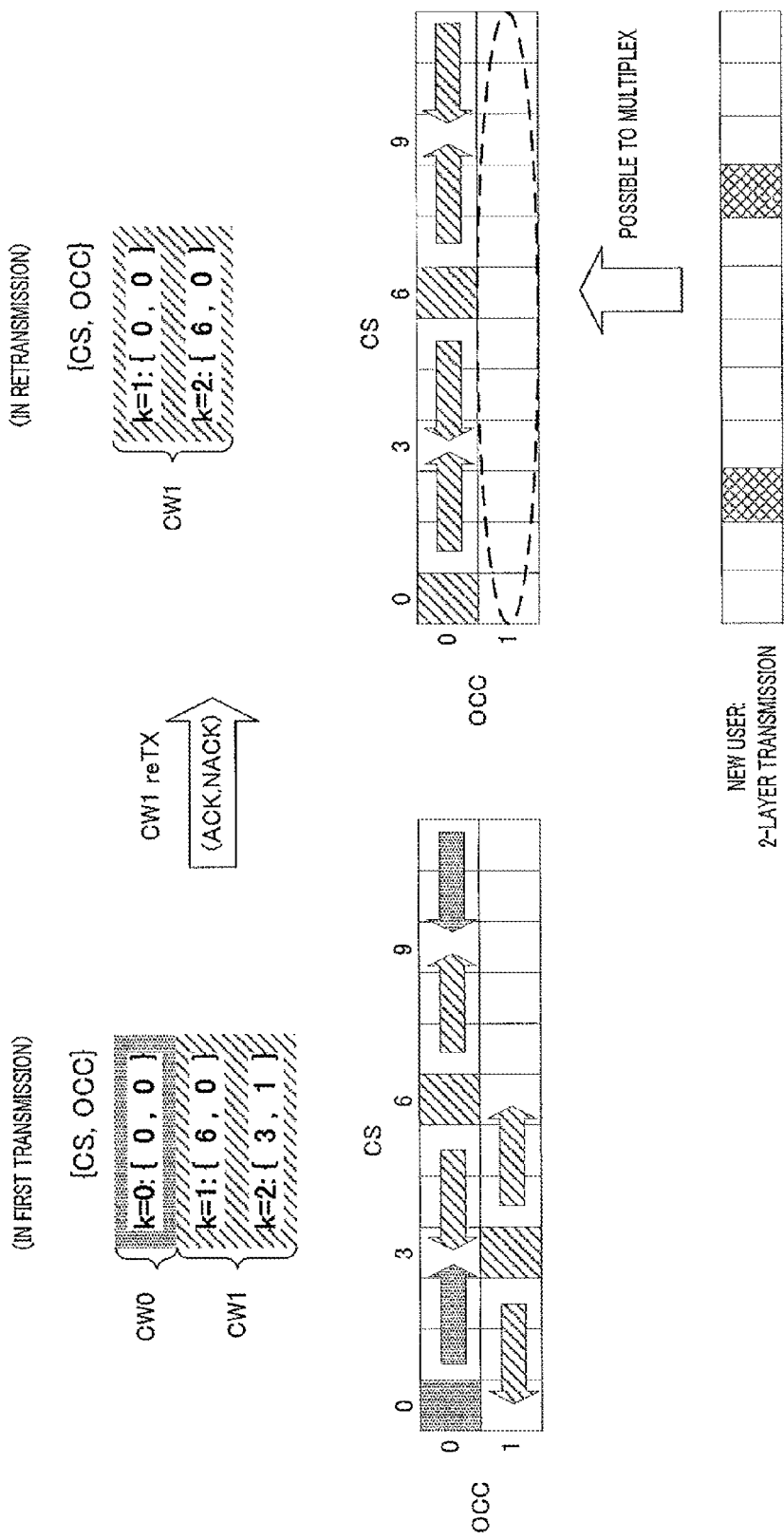
FIG. 6 is a diagram for illustrating a spreading code allocating process according to Embodiment 1 of the present invention.

In the following, as shown in FIG. 6, a case where the first transmission is transmission using three layers, as in the case shown in FIG. 3, will be described. That is, in the first transmission, CW0 is transmitted in the 0-th layer (k=0, Layer 0), CW1 is transmitted in two layers of the first layer (k=1, Layer 1) and the second layer (k=2, Layer 2). The spreading codes used for Layers 0 to 2 in the first transmission are $n_{CS,0}=0$ and $n_{OCC,0}=0$, $n_{CS,1}=6$ and $n_{OCC,1}=0$, and $n_{CS,2}=3$ and $n_{OCC,2}=1$, respectively. As shown in FIG. 6, it is assumed that only CW1 is retransmitted (reTX) as a result of error detection at the base station (that is, CW0: ACK, and CW1: NACK).

Figure 1:
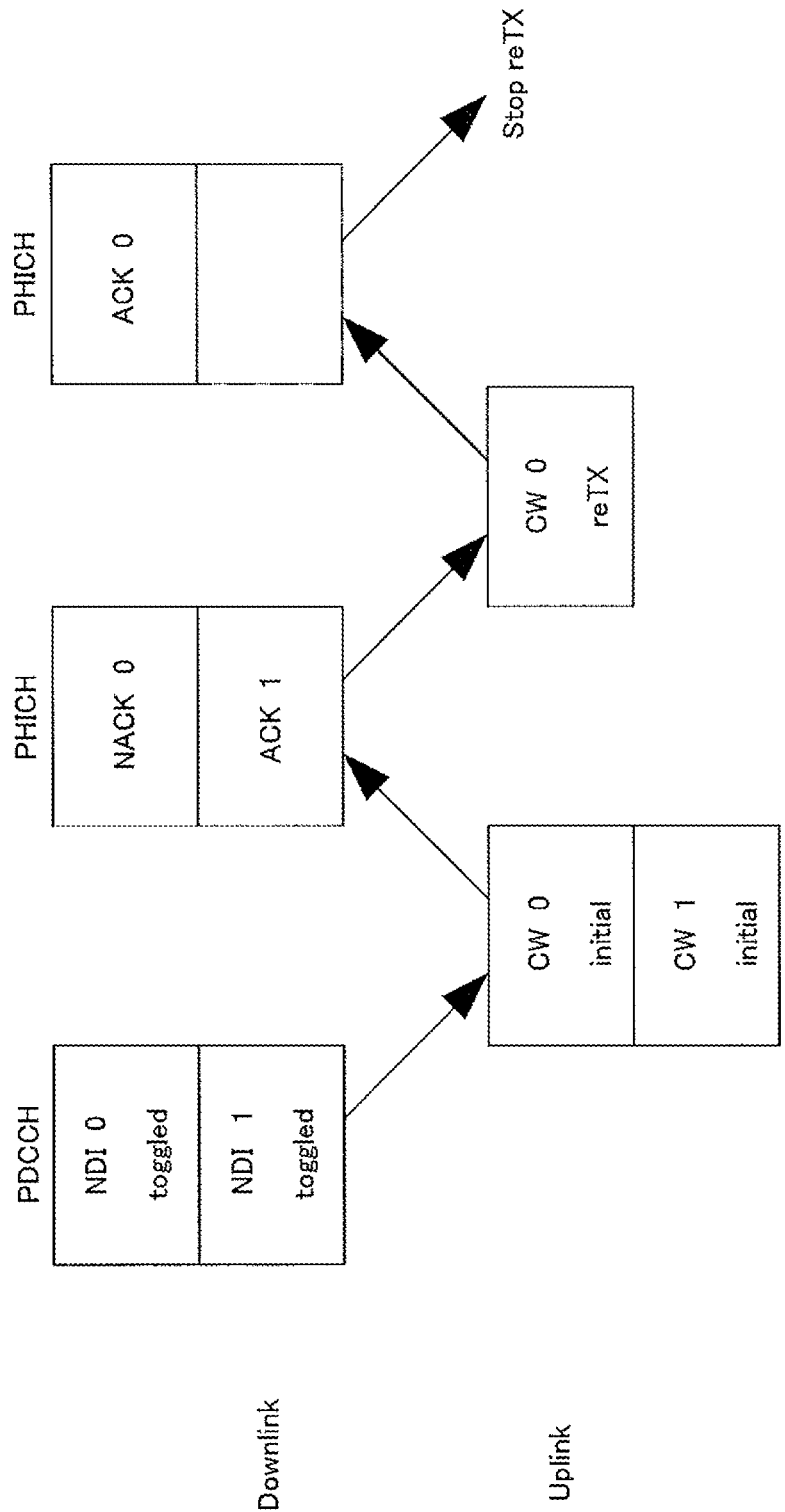
FIG. 1 illustrates a non-adaptive HARQ scheme.
Figure 2:
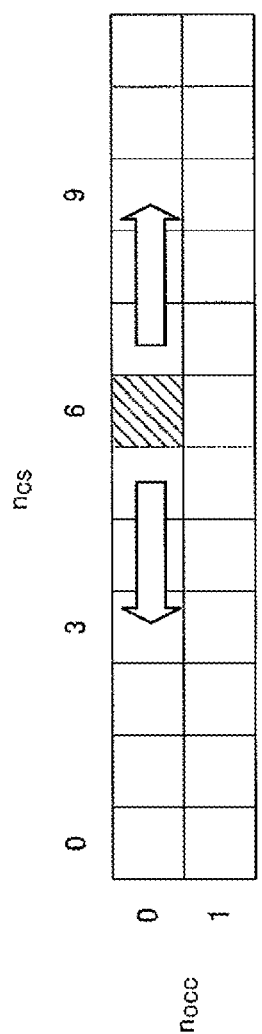
FIG. 2 is a diagram for illustrating interference between reference signals (DMRSs)
Figure 3:
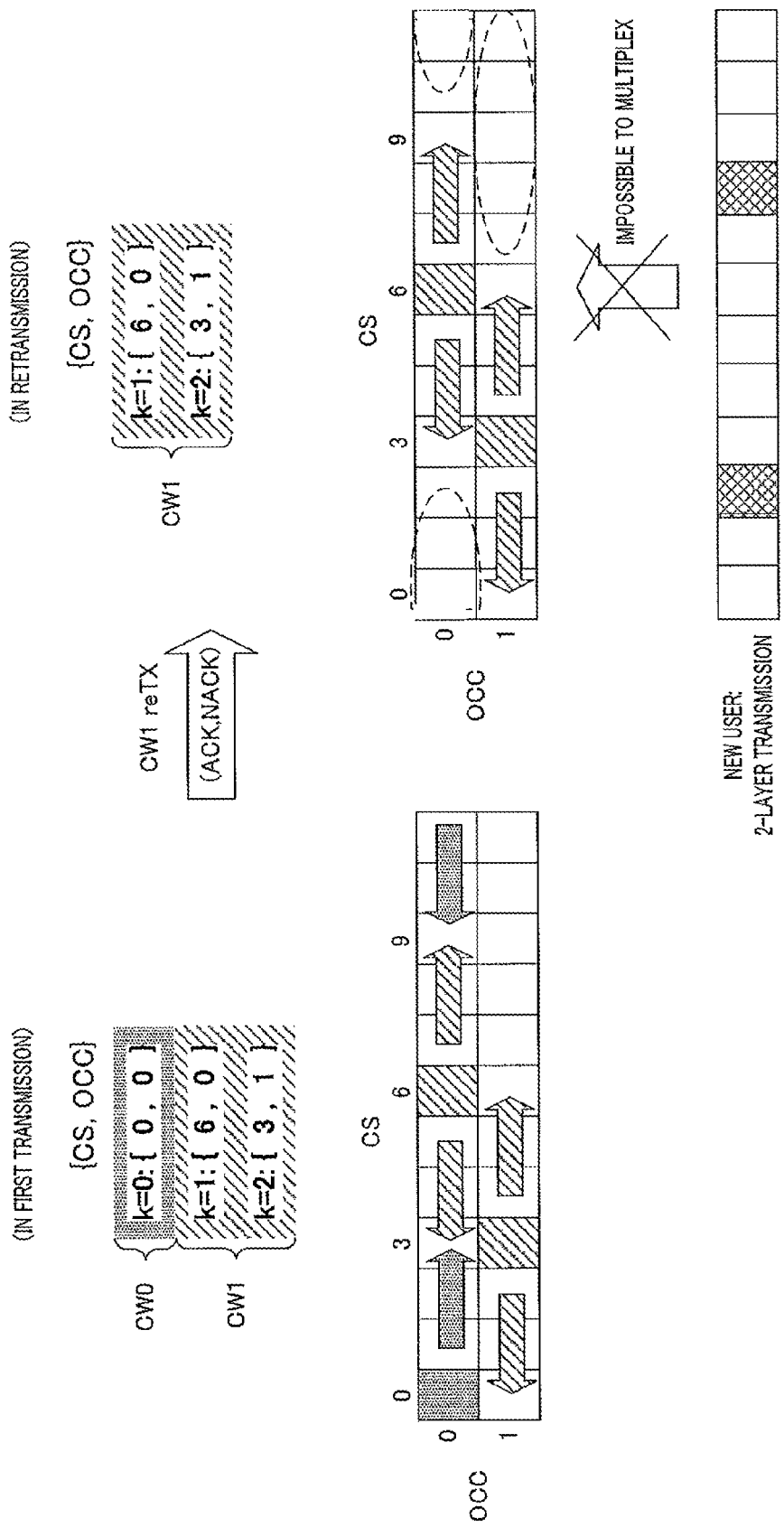
FIG. 3 illustrates the scheme disclosed in Non-Patent Literature 1.

In retransmission of CW1 shown in FIG. 6, if the terminal uses the same spreading code resource for the DMRS (that is, set values stored in retransmission spreading code storage section 111) as that used in the first transmission, different OCCs ($n_{OCC,2}$=0 and 1) are applied to the two layers, Layers 1 and 2, to which CW1 is allocated, as in the case shown in FIG. 3.

Thus, when DMRS generating section 110 receives a response signal requesting for retransmission of only a single CW allocated to a plurality of layers, DMRS generating section 110 uses, for the DMRS generated for the plurality of layers, spreading code resources having the same OCC from among the plurality of spreading code resources defined by the plurality of OCCs ($n_{OCC,k}$=0, 1, in this example). That is, in a situation where different OCCs are applied to a plurality of layers to which the CW to be retransmitted is allocated when the spreading code resources for the DMRSs used in the first transmission are used in the retransmission, the terminal adjusts the spreading code resources for the DMRSs so that the spreading code resources having the same OCC for the plurality of layers to which the CW to be retransmitted is allocated are applied to the DMRSs.

To be more specific, the terminal uses spreading code resources having the same OCC from among the spreading code resources used for the DMRSs generated for a plurality of layers in the first transmission (that is, set values stored in retransmission spreading code storage section 111), for the DMRSs generated for the plurality of layers to which the CW to be retransmitted is allocated. For example, in FIG. 6, the terminal uses two spreading codes having the same OCC ($n_{OCC,k}$=0) in retransmission, from among the three spreading code resources used in the first transmission. As shown in FIG. 6, two spreading codes $n_{CS,1}$=0 and $n_{OCC,1}$=0, and $n_{CS,2}$=6 and $n_{OCC,2}$=0 are used for Layers 1 and 2, respectively, to which CW1 to be retransmitted is allocated, and these spreading codes occupy only one OCC ($n_{OCC,k}$=0).

As a result, as spreading code resources that are other than those occupied by Layers 1 and 2 to which CW1 to be retransmitted is allocated and that do not interfere with the spreading code resources used for CW1, the spreading code resources in the region enclosed by the dashed line in FIG. 6 (the spreading code resources having an OCC of 1 ($n_{OCC,k}$=1) and any cyclic shift sequence ($n_{CS,k}$=0 to 11)) are available.

On the other hand, in a situation where different OCCs are applied to a plurality of layers to which the CW to be retransmitted is allocated when the spreading code resources for the DMRSs allocated to the terminal in the first transmission are used in the retransmission, the base station recognizes that the CW (DMRS) is to be retransmitted using the spreading code resources having the same OCC from among the spreading code resources for the DMRSs allocated to the terminal in the first transmission. And the base station demodulates the retransmitted CW using the spreading codes having the same OCC described above from among the spreading code resources for the DMRS allocated to the terminal in the first transmission. Furthermore, the base station performs resource allocation to another terminal (a new user) taking into consideration that, from among the spreading code resources for the DMRS allocated in the first transmission, the spreading codes having the same OCC are used for the CW retransmitted.

That is, when only the result of error detection of a single CW allocated to a plurality of layers shows a NACK, the base station identifies the spreading code resources used for the DMRS for the plurality of layers transmitted by the terminal that retransmits the single code word as spreading code resources having the same OCC from among the plurality of spreading code resources. Furthermore, the base station allocates, from among the plurality of spreading code resources, spreading code resources having different OCCs than the OCC used by the terminal that performs the retransmission (the identified OCC) to the DMRSs transmitted by another terminal apparatus (a new user) different from the terminal that performs the retransmission.

For example, in FIG. 6, the result of error detection of the data received from CRC detecting section 209 is "CW0: absence of an error and CW1: presence of an error". Therefore, scheduling section 212 identifies that CW1 to be retransmitted next time from the terminal is generated using the DMRSs for the spreading code resources different from those in the first transmission ($n_{OCC,1}$=0, $n_{OCC,2}$=1 shown in FIG. 6) and having the same OCC ($n_{OCC,1}$=0, $n_{OCC,2}$=0 shown in FIG. 6). Then, scheduling section 212 indicates to channel estimating section 202 that the two spreading code resources, $n_{CS,1}$=0 and $n_{OCC,1}$=0, and $n_{CS,2}$=6 and $n_{OCC,2}$=0, are the spreading code resources applied to CW1 to be retransmitted.

Furthermore, as resources to be allocated to the DMRSs for another terminal (a new user) different from the terminal that retransmits CW1 shown in FIG. 6, scheduling section 212 uses spreading code resources that are other than the spreading code resources used for CW1 to be retransmitted ($n_{OCC,1}$=0 shown in FIG. 6) and do not interfere with the spreading code resources used for CW1. In other words, scheduling section 212 can allocate the spreading code resources in the region enclosed by the dashed line in FIG. 6, where the spreading code resources have an OCC of 1 ($n_{OCC,k}$=1) and any cyclic shift sequences ($n_{CS,k}$=0 to 11), to the DMRSs for another terminal.

Therefore, for example, even in the case where a scheduler is to multiplex a new user that performs transmission using two layers as a multiuser MIMO operation (that is, in the case where spreading codes having the same value of OCC and values of $n_{CS,k}$ that differ by 6 or so are used), spreading code resources whose values of $n_{CS,k}$ differ by 6 or so in the region enclosed by the dashed line in FIG. 6 can be allocated. In, this, way, as shown in FIG. 6, the DMRS for the retransmission data (CW1) and DMRSs for another terminal can be multiplexed.

As described above, on the side of the terminal (transmitting apparatus 100), in the case where a response signal that requests for retransmission of only a single code word allocated to a plurality of layers is received, DMRS generating section 110 uses spreading code resources having the same OCC from among a plurality of spreading code resources, for the DMRSs generated for the plurality of layers to which the code word to be retransmitted is allocated. As a result, a shortage of spreading code resources in retransmission can be prevented. In other words, even in the case where non-adaptive HARQ control is applied using the PHICH, it is possible to avoid restrictions on allocation of resources to a new user by the scheduler that would otherwise be imposed due to the continuation of use, for retransmission, of the spreading code resources for different OCCs set for DMRSs for a plurality of layers in the first transmission.

On the side of the base station (receiving apparatus 200), in the case where only the result of error detection of a single code word allocated to a plurality of layers shows a NACK, scheduling section 212 identifies that the spreading code resources used for the DMRSs for a plurality of layers transmitted by the terminal that retransmits the single code word are spreading code resources having the same OCC from among a plurality of spreading code resources. Furthermore, from among a plurality of spreading code resources, scheduling section 212 allocates, to DMRSs transmitted by another terminal (a new user) different from the terminal that performs the retransmission, spreading code resources having different OCCs than the OCC used by the terminal that performs the retransmission (the same OCC for the layers). Accordingly, resources are adequately allocated to each terminal in application of multiuser MIMO.

Therefore, according to the present embodiment, the scheduler can perform spreading code allocation by avoiding restrictions on allocation of resources to a new user even in the case where non-adaptive HARQ control is applied using the PHICH.

Embodiment 2

According to Embodiment 2, spreading code resources for the same OCC are used for DMRS generated for a plurality of layers to which one CW to be retransmitted is allocated, as in Embodiment 1. However, the present embodiment differs from Embodiment 1 in that the OCC used by the terminal (the same OCC for the layers) is changed each time retransmission occurs.

In the following, the present embodiment will be described in detail.

Figure 7:
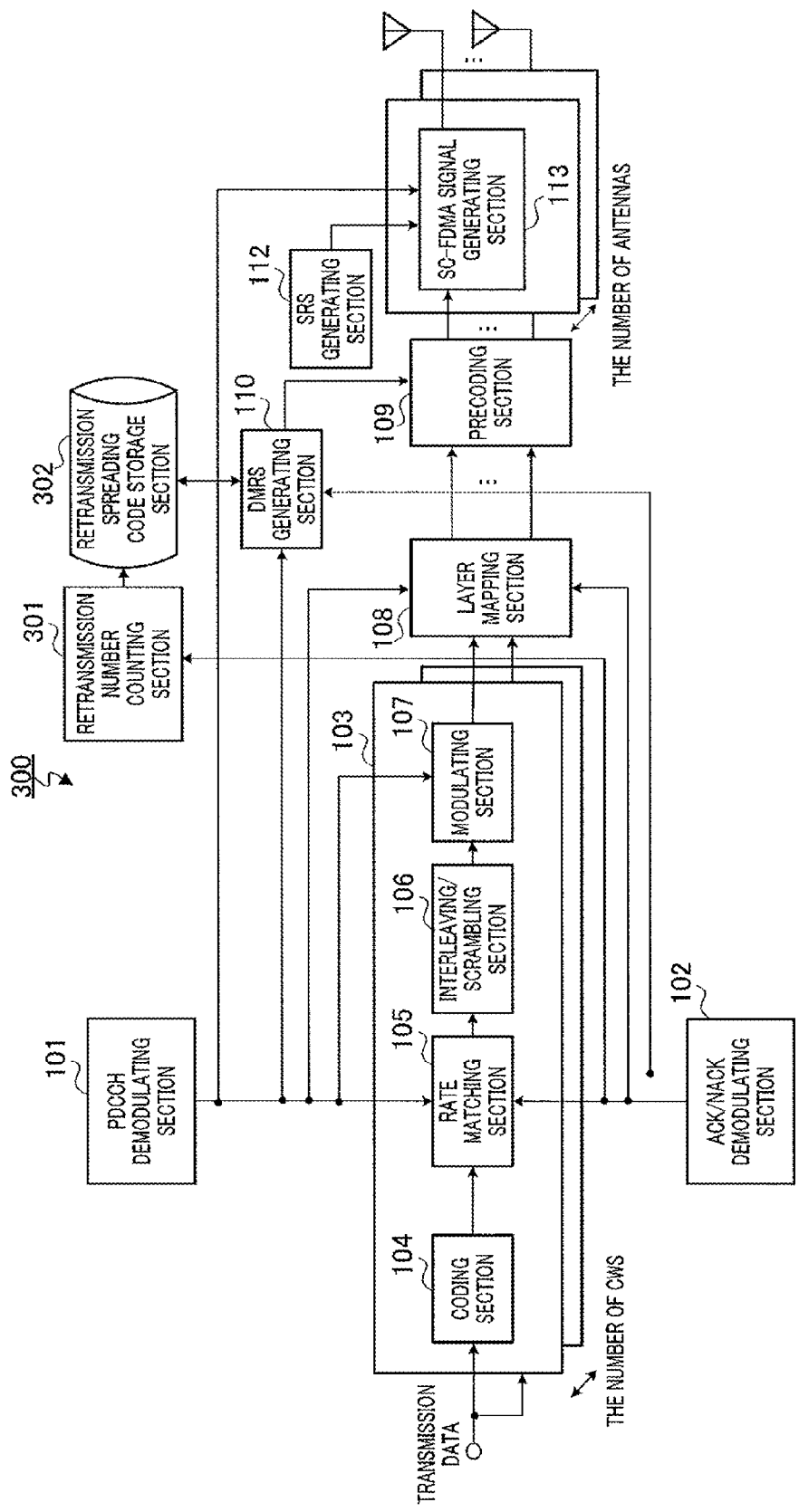
FIG. 7 is a block diagram showing a configuration of main components of a transmitting apparatus according to Embodiment 2 of the present invention.

FIG. 7 is a block diagram showing a configuration of main components of a transmitting apparatus according to the present embodiment. In transmitting apparatus 300 according to the present embodiment in FIG. 7, components in FIG. 7 common to FIG. 4 are assigned the same reference numerals as in FIG. 4, and descriptions thereof are omitted here. Transmitting apparatus 300 shown in FIG. 7 is transmitting apparatus 100 shown in FIG. 4 in which retransmission number counting section 301 is additionally provided, and retransmission spreading code storage section 111 is replaced with retransmission spreading code storage section 302.

For each CW received from ACK/NACK demodulating section 102, if the ACK/NACK information shows a NACK, retransmission number counting section 301 increments the number of retransmissions for the CW and stores the number in the interior. In other words, retransmission number counting section 301 counts the number of retransmissions for each CW and stores the counted number of retransmissions for each CW. In addition, for each CW, if the ACK/HACK information shows an ACK, retransmission number counting section 301 resets the number of retransmissions for the CW. Then, retransmission number counting section 301 outputs the counted number of retransmissions for each CW to retransmission spreading code storage section 302.

Retransmission spreading code storage section 302 sets the OCC in accordance with the number of retransmissions received from retransmission number counting section 301 in accordance with a predetermined rule concerning the OCCs included in the spreading code resources. For example, in an odd-numbered retransmission, retransmission spreading code storage section 302 outputs the stored spreading code resources without change to DMRS generating section 110, as in Embodiment 1. On the other hand, in an even-numbered retransmission, retransmission spreading code storage section 302 outputs the stored spreading code resources with their OCCs inverted to DMRS generating section 110. Note that the operations of retransmission spreading code storage section 302 are not limited to the processes described above, and the operation in the odd-numbered retransmission and the operation in the even-numbered retransmission may be interchanged.

As in Embodiment 1, in retransmission of only a single CW allocated to a plurality of layers, DMRS generating section 110 uses spreading code resources having the same OCC for the DMRSs generated for the plurality of layers to which the CW to be retransmitted is allocated. However, for each retransmission, DMRS generating section 110 changes the OCC used for the DMRSs generated for the plurality of layers to which the single CW to be retransmitted is allocated (the same OCC for the layers).

For example, as shown in FIG. 6, it is assumed that the first transmission is transmission using three layers, and the spreading codes used for the layers (k=0, 1 and 2, Layers 0, 1 and 2) are $n_{CS,0}=0$ and $n_{OCC,0}=0$, $n_{CS,1}=6$ and $n_{OCC,1}=0$, and $n_{CS,2}=3$ and $n_{OCC,2}=1$.

Here, as shown in FIG. 6, it is assumed that only CW1 allocated to Layers 1 and 2 (k=1, 2) is to be retransmitted. In this case, in the odd-numbered (first, third, fifth and so on) retransmissions, DMRS generating section 110 uses the two spreading codes ($n_{CS,1}=0$ and $n_{OCC,1}=0$, and $n_{CS,2}=6$ and $n_{OCC,2}=0$) having the same OCC ($n_{OCC,k}=0$) without change, as shown in FIG. 6.

On the other hand, in the even-numbered (second, fourth, sixth and so on) retransmissions, DMRS generating section 110 uses the spreading code resources ($n_{CS,1}=0$ and $n_{OCC,1}=1$, and $n_{CS,2}=6$ and $n_{OCC,2}=1$) obtained by inverting the OCC of the two spreading codes for the same OCC ($n_{OCC,k}=0$) ($n_{CS,1}=0$ and $n_{OCC,1}=0$, and $n_{CS,2}=6$ and $n_{OCC,2}=0$) (that is, the OCC is inverted from $n_{OCC,k}=0$ to $n_{OCC,k}=1$) (not shown).

As a result, the DMRSs generated for the plurality of layers to which the CW to be retransmitted is allocated occupy spreading code resources having different OCCs in each retransmission. For example, in FIG. 6, in each of Layers 1 and 2 (k=1, 2) to which CW1 to be retransmitted is allocated, spreading code resources having one OCC ($n_{OCC,k}=0$) are occupied in the odd-numbered retransmissions, and spreading code resources having the other OCC ($n_{OCC,k}=1$) are occupied in the even-numbered retransmissions.

On the other hand, on the side of the base station (receiving apparatus 200 (FIG. 5)), scheduling section 212 has the same function (not shown) as that of retransmission number counting section 301 of the terminal and outputs spreading code resources having different OCCs changed in accordance with the counted number of retransmissions of each CW to channel estimating section 202 in the same manner as the terminal (transmitting apparatus 300). Furthermore, as in Embodiment 1, from among a plurality of spreading code resources, scheduling section 212 allocates spreading code resources having different OCCs than the OCC used by the terminal that performs the retransmission (the same OCC for a plurality of layers) to the DMRSs transmitted by another terminal (a new user) different from the terminal instructed to retransmit the CW allocated to the plurality of layers.

With such a configuration, according to the present embodiment, it is possible to avoid using a particular OCC (either one of $n_{OCC,k}=0$ or 1, for example) on the terminal that retransmits only the CW allocated to a plurality of layers. Therefore, the present embodiment not only achieves the same advantages as those of Embodiment 1 but also allows multiplexing of another terminal using different spreading codes for each retransmission of the CW.

Embodiment 3

In Embodiments 1 and 2, cases have been described in which spreading code resources used for DMRSs used in CW retransmission are adjusted in accordance with the spreading code resources used in the first transmission and the occurrences of ACKs and NACKs. According to the present embodiment, spreading code resources used for DMRSs used in CW transmissions (the first transmission and the subsequent retransmissions) are adjusted in accordance with the spreading code resources and the number of transmission layers (the transmission rank number) reported through the PDCCH.

In the following, the present embodiment will be described in detail.

Figure 8:
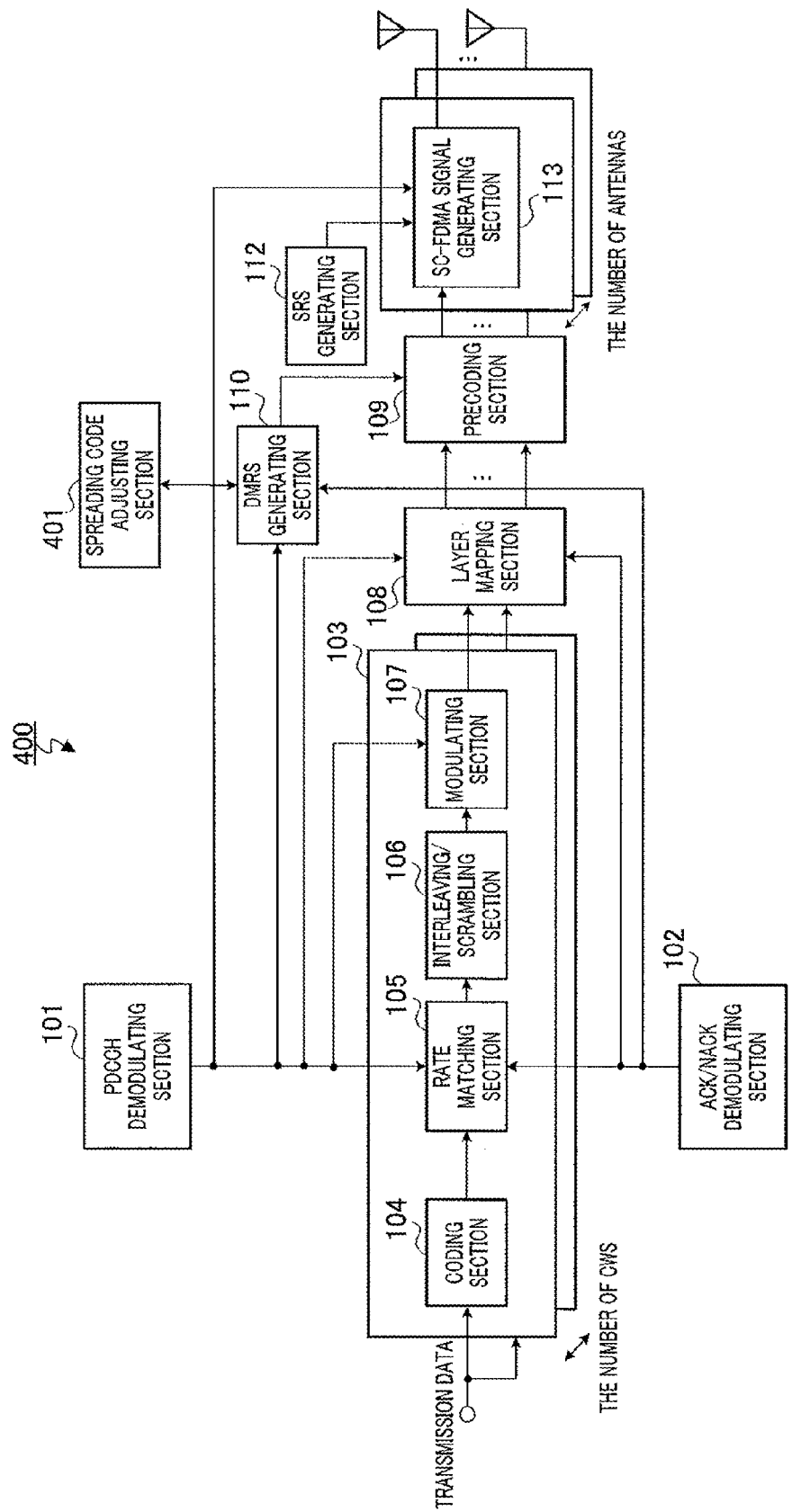
FIG. 8 is a block diagram showing a configuration of main components of a transmitting apparatus according to Embodiment 3 of the present invention.

FIG. 8 is a block diagram showing a configuration of main components of a transmitting apparatus according to the present embodiment. In transmitting apparatus 400 according to the present embodiment in FIG. 8, components in FIG. 8 common to FIG. 4 are assigned the same reference numerals as in FIG. 4, and descriptions thereof are omitted here. Transmitting apparatus 400 shown in FIG. 8 is transmitting apparatus 100 shown in FIG. 4 in which retransmission spreading code storage section 111 is replaced with spreading code adjusting section 401.

In transmitting apparatus 400 (terminal) shown in FIG. 8, DMRS generating section 110 calculates, based on the spreading codes ($n_{CS,0}$ and $n_{OCC,0}$, for example) used for the DMRS associated with the 0-th layer (k=0, Layer 0) included in the transmission parameters reported from the base station through the PDCCH, spreading codes used for the DMRS associated with each of the other layers (k=1, 2 and 3, Layers 1, 2 and 3), as in Embodiment 1. Then, DMRS generating section 110 outputs the calculated spreading codes (the spreading codes used for each of the layers (k=0 to 3)) and the transmission rank number (that is, the number of transmission layers) included in the transmission parameters to spreading code adjusting section 401.

Spreading code adjusting section 401 adjusts the spreading codes received from DMRS generating section 110 based on the transmission rank number received from DMRS generating section 110. To be more specific, spreading code adjusting section 401 adjusts (resets) the spreading codes used for the respective number of transmission layers so that spreading code resources having the same OCC are allocated to the DMRSs generated for each of the plurality of layers to which the same CW is allocated, by referring to the relationship between the layers determined by the value of the transmission rank number (the number of transmission layers) and the CWs.

Then, DMRS generating section 110 generates DMRSs using the spreading codes (adjusted spreading codes) received from spreading code adjusting section 401 and outputs the generated DMRSs to precoding section 109. If the ACK/NACK information received from ACK/NACK demodulating section 102 shows a NACK (that is, if a retransmission is required), DMRS generating section 110 uses the same spreading codes used in the first transmission (adjusted spreading codes) without change.

Next, a spreading code adjusting process performed by spreading code adjusting section 401 will be described in detail.

Spreading code adjusting section 401 receives spreading code resources used for the DMRS for each layer (Layer 0 to 3), from DMRS generating section 110. To be more specific, as shown in the left half of FIG. 9, the spreading codes for Layer 0 (k=0) are $n_{CS,0}=0$ and $n_{OCC,0}=0$, the spreading codes for Layer 1 (k=1) are $n_{CS,1}=6$ and $n_{OCC,1}=0$, the spreading codes for Layer 2 (k=2) are $n_{CS,2}=3$ and $n_{OCC,2}=1$, and the spreading codes for Layer 3 (k=3) are $n_{CS,3}=9$ and $n_{OCC,3}=1$.

As described above, in transmission using three layers, as the relationship between the layers and the CWs, CW0 is allocated to Layer 0 (k=0), and CW1 is allocated to Layers 1 and 2 (k=1, 2). Accordingly, as shown in the left half of FIG. 9, if the terminal uses the spreading code resources for the DMRSs indicated through the PDCCH (that is, the set values inputted to spreading code adjusting section 401) without change, different OCCs ($n_{OCC,2}=0$, 1) are applied to the two layers, Layers 1 and 2, to which CW1 is allocated, as in the case shown in FIG. 3. In other words, different OCCs are used in the DMRSs generated for the plurality of layers to which the same CW is allocated.

In view of this, spreading code adjusting section 401 adjusts the spreading code resource used in each layer for the respective number of transmission layers so that spreading code resources for the same OCC are used for the DMRSs generated for the plurality of layers to which the same CW is allocated.

Figure 9:
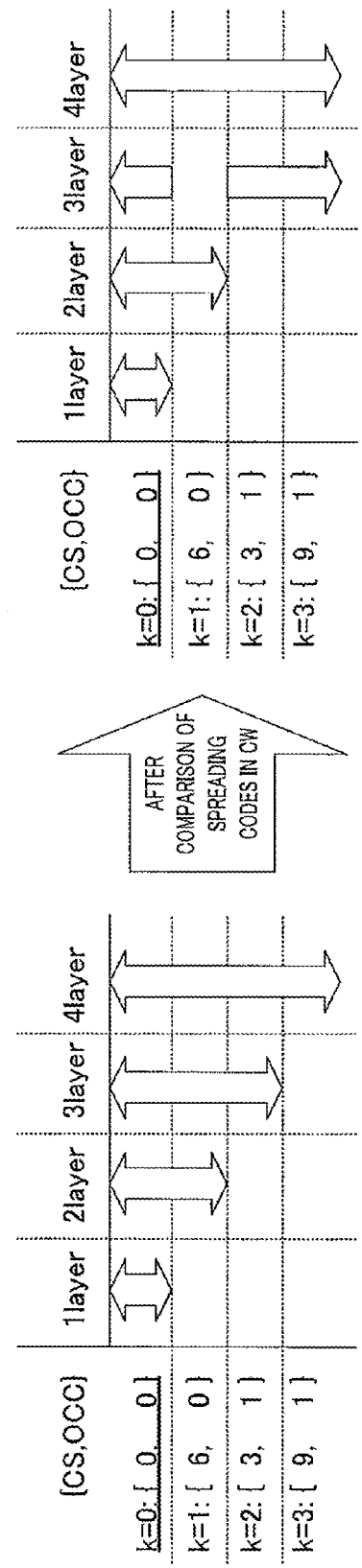
FIG. 9 is a diagram for illustrating a spreading code setting process according to Embodiment 3 of the present invention.

To be more specific, as shown in the right half of FIG. 9, spreading code adjusting section 401 adjusts spreading code resources $n_{CS,0}=0$ and $n_{OCC,0}=0$ for k=0, $n_{CS,2}=3$ and $n_{OCC,2}=1$ for k=2, and $n_{CS,3}=9$ and $n_{OCC,3}=1$ for k=3 as the spreading code resources used in transmission using three layers (three layers shown in FIG. 9). In other words, spreading code adjusting section 401 uses the spreading codes $n_{CS,3}=9$ and $n_{OCC,3}=1$ for =3 used in transmission using four layers, instead of the spreading codes $n_{CS,1}=6$ and $n_{OCC,1}=0$ for k=1 that would otherwise be used in transmission using three layers.

Figure 10:
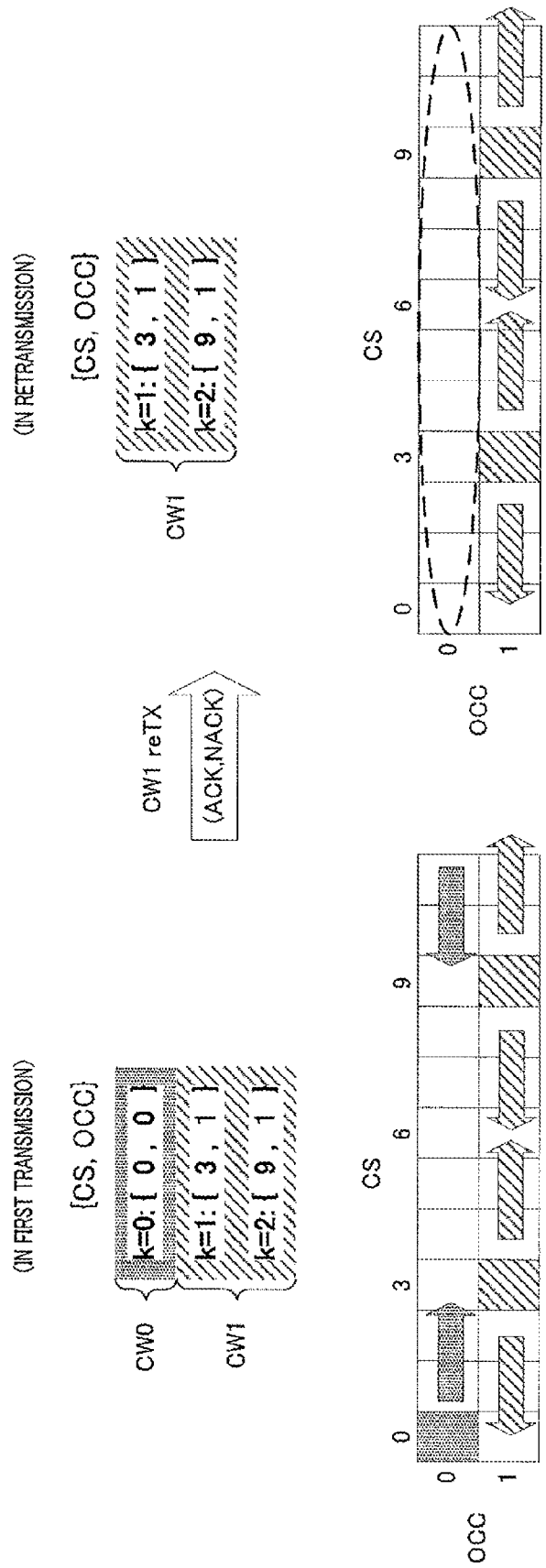
FIG. 10 is a diagram for illustrating a spreading code allocating process according to Embodiment 3 of the present invention.

As a result, as shown in the left half of FIG. 10, in the first transmission using three layers, DMRS generating section 110 generates a DMRS using $n_{CS,0}=0$ and $n_{OCC,0}=0$ for Layer 0 (k=0) to which CW0 is allocated, and generates a DMRS using $n_{CS,1}=3$ and $n_{OCC,1}=1$, and $n_{CS,2}=9$ and $n_{OCC,2}=1$ for Layers 1 and 2 to which CW1 is allocated, respectively.

In other words, spreading code resources for the same OCC ($n_{OCC,k}=1$) are used for the DMRSs generated for the two layers, Layers 1 and 2, to which CW1 is allocated.

In the case where the terminal (transmitting apparatus 400) detects no ACK for a CW transmitted therefrom, the terminal is to transmit retransmission data for the CW. In the retransmission, DMRS generating section 110 uses the spread code resources used for the DMRSs in the first transmission (that is, the adjusted spreading code resources shown in the right half of FIG. 9) without change. For example, in FIG. 10, in the case where retransmission of only CW1 occurs, DMRS generating section 110 uses the spreading code resources ($n_{CS,1}=3$ and $n_{OCC,1}=1$, and $n_{CS,2}=9$ and $n_{OCC,2}=1$) used in the first transmission for the DMRSs generated for the two layers, Layers 1 and 2, to which CW1 is allocated.

As a result, as shown in the right half of FIG. 10, even when only CW1 allocated to a plurality of layers is to be retransmitted, the spreading code resources having an OCC of 0 ($n_{OCC,k}=0$) and any cyclic shift sequence ($n_{CS,k}=0$ to 11), that is, the spreading code resources in the region enclosed by the dashed line, are available as spreading code resources that can be allocated to another terminal (a new user) that can be multiplexed in the same resource.

On the other hand, on the side of the base station (receiving apparatus 200 (FIG. 5)), scheduling section 212 has the same function (not shown) as that of spreading code adjusting section 401 of the terminal and outputs the adjusted (reset) spreading code resources to channel estimating section 202 in the same manner as the terminal (transmitting apparatus 400). Furthermore, from among a plurality of spreading code resources, scheduling section 212 allocates, to the DMRSs transmitted by another terminal (a new user) different from the terminal instructed to retransmit only the CW allocated to the plurality of layers, spreading code resources having different OCCs than the OCC used by the terminal that performs the retransmission (the same OCC for a plurality of layers). As a result, an appropriate resource is allocated to each terminal even in the case where the multiuser MIMO is applied.

Therefore, for example, in FIG. 10, even in the case where the scheduler is to multiplex an LTE terminal (a new user) that is only capable of an multiuser MIMO operation using an OCC of 0 ($n_{OCC,k}=0$), a sufficient amount of resources can be provided for the LTE terminal.

As described above, according to the present embodiment, in preparation for occurrence of retransmission, the terminal (transmitting apparatus 400) uses, in the first transmission, spreading code resources having the same OCC from among a plurality of spreading codes for DMRSs generated for a plurality of layers to which the same CW, which is a unit of retransmission, is allocated. As a result, a shortage of spreading code resources in retransmission can be prevented. In other words, even in the case where non-adaptive HARQ control is applied using the PHICH (even in the case where the spreading codes for the DMRS cannot be reported through the PHICH), it is possible to avoid restrictions on allocation of resources to a new user by the scheduler that would otherwise be imposed due to the use, for retransmission, of spreading code resources for different OCCs.

Therefore, according to the present embodiment, as in Embodiment 1, the scheduler can perform spreading code allocation by avoiding restrictions on allocation of resources to a new user even in the case where non-adaptive HARQ control is applied using the PHICH.

Embodiments of the present invention have been described above.

Although the present invention has been described above with embodiments using antennas, the present invention is equally applicable to antenna ports.

An antenna port refers to a theoretical antenna comprised of one or a plurality of physical antennas. In other words, "antenna port" does not necessarily refer to one physical antenna, but may refer to an array antenna and so forth composed of a plurality of antennas.

For example, 3 GPP LTE does not define how many physical antennas an antenna port is formed with, but defines that an antenna port is the minimum unit for transmitting different reference signals in a base station.

In addition, an antenna port may be defined as a minimum unit for multiplying a precoding vector as weighting.

Although an example of the present invention configured as hardware has been described in the present embodiments, the present invention may also implement software in collaboration with hardware.

Furthermore, each function block employed in the above descriptions of embodiments may typically be implemented as an LSI constituted by an integrated circuit. These may be implemented individually as single chips, or a single chip may incorporate some or all of the function blocks. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI production, utilization of an FPGA (Field Programmable Gate Array) or a reconfigurable processor where connections and settings of circuit cells in an LSI can be reconfigured may also be possible.

In the event of the introduction of a circuit implementation technology whereby LSI is replaced by a different technology, which is advanced in or derived from semiconductor technology, integration of the function blocks may of course be performed using technology therefrom. An application to biotechnology and/or the like is also possible.

The disclosure of Japanese patent application No. 2010-181344, filed on Aug. 13, 2010, including the specifications, drawings and abstracts, is incorporated herein by reference in its entirety.

INDUSTRIAL APPLICABILITY

A terminal apparatus, a base station apparatus, a retransmission method, and a resource allocation method according to the present invention are suitable for performing a method of controlling retransmission using non-adaptive HARQ in a radio communication system using a MIMO communication technique.

REFERENCE SIGNS LIST 100, 300, 400 Transmitting apparatus
101 PDCCH demodulating section
102 ACK/NACK demodulating section
103 Code word generating section
104 Coding section
105 Rate matching section
106 Interleaving/scrambling section
107 Modulating section
108 Layer mapping section
109 Precoding section
110 DMRS generating section
111, 302 Retransmission spreading code storage section
112 SRS generating section
113 SC-FDMA signal generating section
200 Receiving apparatus
201 Receiving RF section
202 Channel estimating section
203 Spatial demultiplexing synchronization detecting section
204 Layer demapping section
205 Error detecting section
206 Likelihood generating section
207 Retransmission combining section
208 Decoding section
209 CRC detecting section
210 PHICH generating section
211 PDCCH generating section
212 Scheduling section
301 Retransmission number counting section
401 Spreading code adjusting section

The invention claimed is:
1. A terminal apparatus comprising:
a layer mapper which, in operation, maps a first codeword to a first layer and a second layer, and maps a second codeword to at least a third layer that is different from the first layer and the second layer;
a reference signal generator which, in operation:
generates a first demodulation reference signal associated for the first layer by using a first cyclic shift value and a first orthogonal sequence;

generates a second demodulation reference signal associated for the second layer by using a second cyclic shift value and a second orthogonal sequence; and generates a third demodulation reference signal associated for the third layer by using a third cyclic shift value and a third orthogonal sequence, a plurality of combinations being prepared for a combination of an index specifying a cyclic shift value and an orthogonal sequence;

a transmitter which, in operation, transmits the mapped first codeword with the generated first demodulation reference signal and the generated second demodulation reference signal, and transmits the mapped second codeword with the generated third demodulation reference signal; and a receiver which, in operation, receives ACK/NACK information indicating an error detection result of each of the transmitted first codeword and the transmitted second codeword, wherein, when the received ACK/NACK information denotes a retransmission request of the first codeword that is mapped to the first layer and the second layer, the reference signal generator generates a fourth demodulation reference signal for retransmission by using a fourth orthogonal sequence and generates a fifth demodulation reference signal for retransmission by using a fifth orthogonal sequence, the fourth demodulation reference signal and the fifth demodulation reference signal being respectively associated for the first layer and the second layer, the fourth orthogonal sequence for the first layer being the same as the fifth orthogonal sequence for the second layer, regardless of whether the first orthogonal sequence is the same as the second orthogonal sequence or the first orthogonal sequence is different from the second orthogonal sequence in a previous transmission, and wherein the transmitter retransmits the first codeword that is mapped to the first layer and the second layer with the generated fourth demodulation reference signal and the generated fifth demodulation reference signal.

2. The terminal apparatus according to claim 1, wherein a number of layers used to retransmit the first codeword of which a retransmission is requested is smaller than a total number of layers used to transmit the first codeword and the second codeword.

3. The terminal apparatus according to claim 1, wherein the ACK/NACK information is transmitted using a HARQ reporting channel (PHICH).

4. The terminal apparatus according to claim 1, wherein the ACK/NACK information indicates that error was detected for the first codeword and that error was not detected for the second codeword.

5. The terminal apparatus according to claim 1, wherein when retransmission of the first codeword is performed a plurality of times, the reference signal generator changes a common orthogonal sequence used as the fourth orthogonal sequence for the first layer and the fifth orthogonal sequence for the second layer each time the retransmission is performed.

6. The terminal apparatus according to claim 1, wherein the reference signal generator sets a common orthogonal sequence used as the fourth orthogonal sequence for the first layer and the fifth orthogonal sequence for the second layer such that a different orthogonal sequence is set between an odd number retransmission and an even number retransmission of the first codeword.

7. A communication method comprising:

mapping a first codeword to a first layer and a second layer, and mapping a second codeword to at least a third layer that is different from the first layer and the second layer;

generating a first demodulation reference signal associated for the first layer by using a first cyclic shift value and a first orthogonal sequence;

generating a second demodulation reference signal associated for the second layer by using a second cyclic shift value and a second orthogonal sequence; and generating a third demodulation reference signal associated for the third layer by using a third cyclic shift value and a third orthogonal sequence, a plurality of combinations being prepared for a combination of an index specifying a cyclic shift value and an orthogonal sequence;

transmitting the mapped first codeword with the generated first demodulation reference signal and the generated second demodulation reference signal;

transmitting the mapped second codeword with the generated third demodulation reference signal;

receiving ACK/NACK information indicating an error detection result of each of the transmitted first codeword and the transmitted second codeword, wherein, when the received ACK/NACK information denotes a retransmission request of the first codeword that is mapped to the first layer and the second layer, the generating further includes generating a fourth demodulation reference signal for retransmission by using a fourth orthogonal sequence and generating a fifth demodulation reference signal for retransmission by using a fifth orthogonal sequence, the fourth demodulation reference signal and the fifth demodulation reference signal being respectively associated for the first layer and the second layer, the fourth orthogonal sequence for the first layer being the same as the fifth orthogonal sequence for the second layer, regardless of whether the first orthogonal sequence is the same as the second orthogonal sequence or the first orthogonal sequence is different from the second orthogonal sequence in a previous transmission; and retransmitting the first codeword that is mapped to the first layer and the second layer with the generated fourth demodulation reference signal and the generated fifth demodulation reference signal.

8. The communication method according to claim 7, wherein
a number of layers used to retransmit the first codeword of which a retransmission is requested is smaller than a total number of layers used to transmit the first codeword and the second codeword.

9. The communication method according to claim 7, wherein
the ACK/NACK information is transmitted using a HARQ reporting channel (PHICH).

10. The communication method according to claim 7, wherein
the ACK/NACK information indicates that error was detected for the first codeword and that error was not detected for the second codeword.

11. The communication method according to claim 7, wherein
when retransmission of the first codeword is performed a plurality of times, the generating of the demodulation reference signal changes a common orthogonal sequence used as the fourth orthogonal sequence for the first layer and the fifth orthogonal sequence for the second layer each time the retransmission is performed.

12. The communication method according to claim 7, wherein
- a common orthogonal sequence used as the fourth orthogonal sequence for the first layer and the fifth orthogonal sequence for the second layer is set such that a different orthogonal sequence is set between an odd number retransmission and an even number retransmission of the first codeword.

* * * * *